Sept. 29, 1953
T. R. WARNER
2,653,436
VINE DIVIDING MEANS
Filed Sept. 6, 1949
2 Sheets-Sheet 1
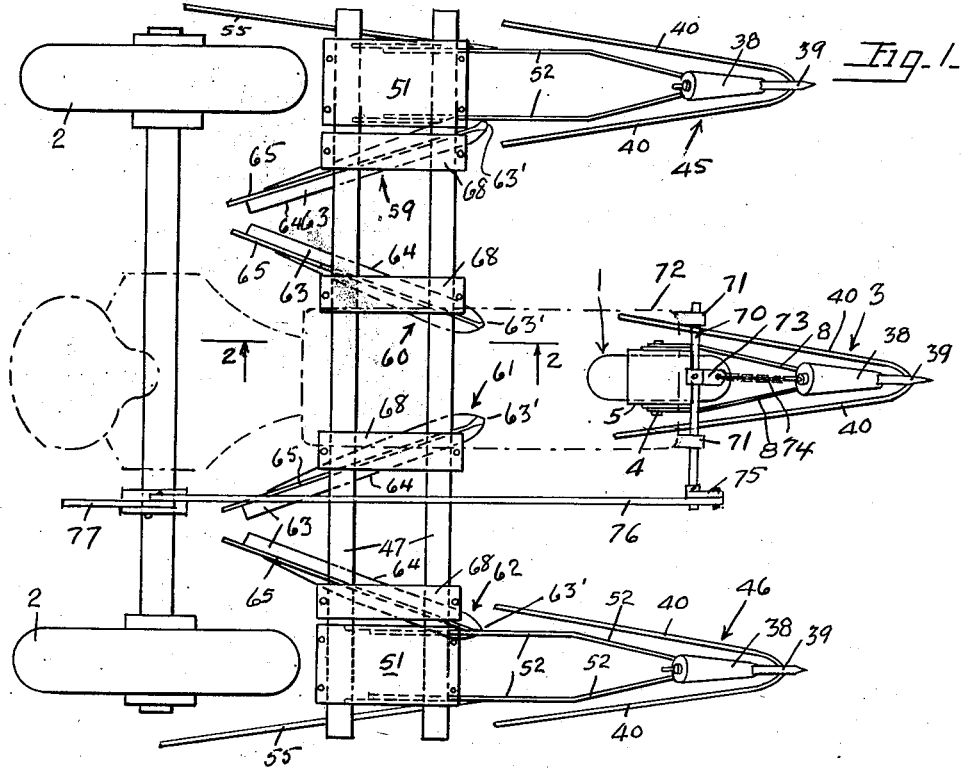
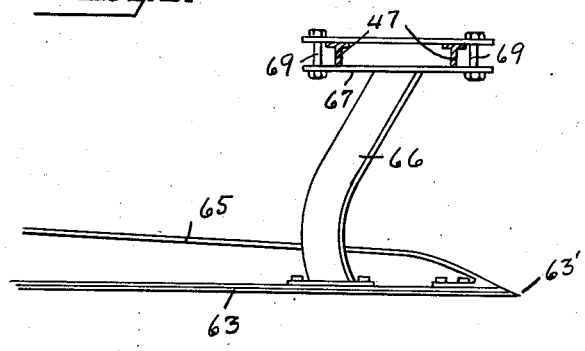
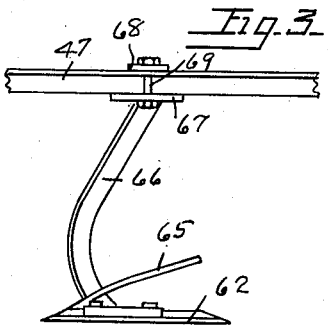
INVENTOR.
THOMAS R. WARNER
BY
Boyken, Mohler & Beckley
ATTORNEYS Sept. 29, 1953 T. R. WARNER 2,653,436
VINE DIVIDING MEANS
Filed Sept. 6, 1949 2 Sheets-Sheet 2
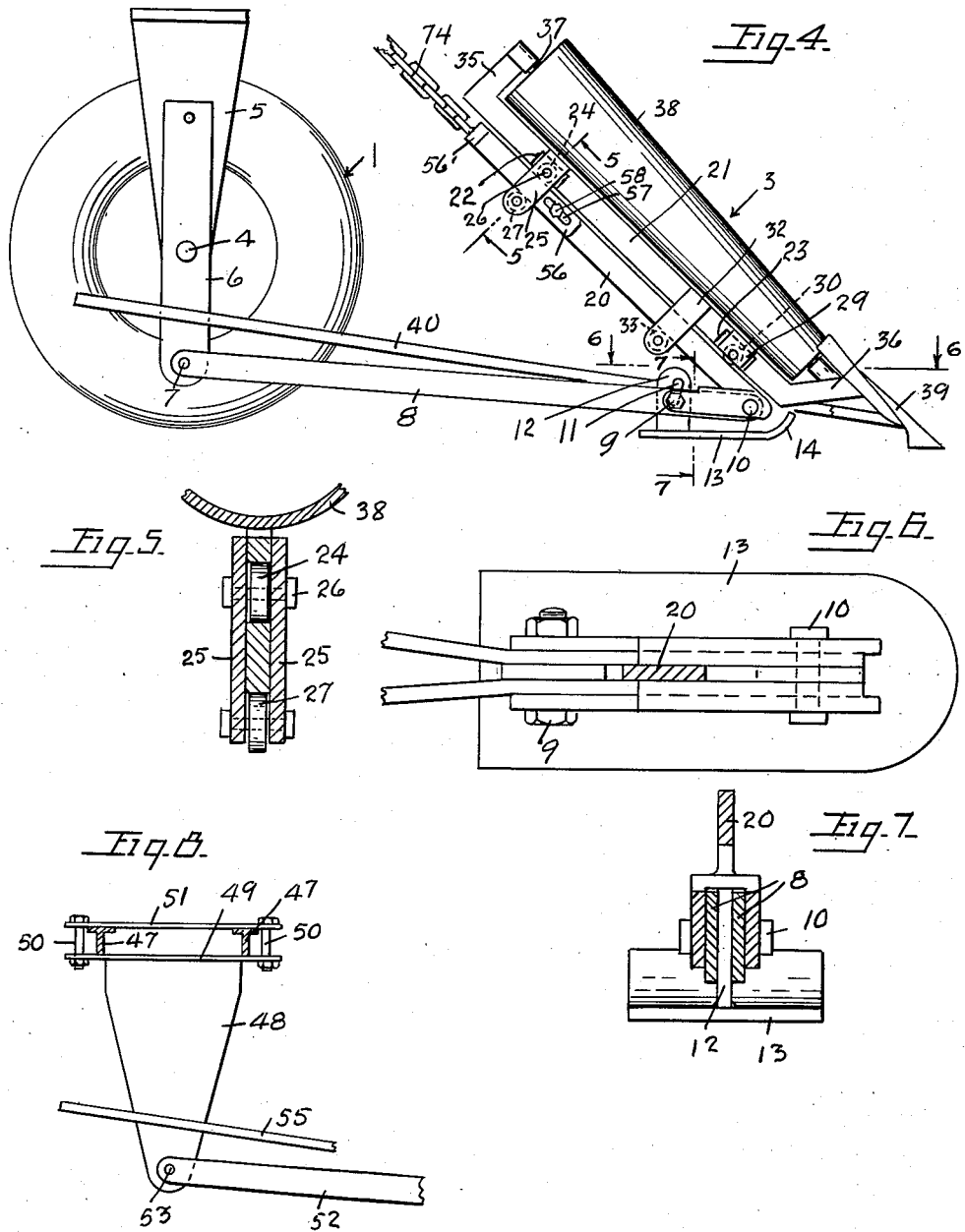
INVENTOR.
THOMAS R. WARNER
BY
Boyken, Mohler & Beckley
ATTORNEYS Patented Sept. 29, 1953

2,653,436

UNITED STATES PATENT OFFICE 2,653,436

VINE DIVIDING MEANS

Thomas R. Warner, Gonzales, Calif.

Application September 6, 1949, Serial No. 114,267

5 Claims. (Cl. 56—1)

1

This invention relates to a bean harvester and the like and has for one of its objects the provision of simple, rugged and more efficient means for dividing bean vines ahead of the ground wheels of the harvester and for cutting and windrowing the vines so divided.

Another object of the invention is the provision of an improved vine divider in a bean harvester that more efficiently divides the vines ahead of the ground wheels than heretofore, and which divider is adapted to be automatically relieved of any detrimental strain placed thereon due to irregularities in the ground or unusual impediments or excessive load, without injury to the divider or vines.

A still further object of the invention is the provision of an improved unitary vine cutter and windrowing device in a harvester that is adjustable to any desired angle and that is formed to prevent undesirable jamming of vines ahead of the cutter or windrow forming element thereby facilitating the cutting and windrowing operation.

In the harvesting of beans and similar vine crops, the vines become interlaced across the furrows or spaces between the rows and as these vines carry valuable beans a problem is presented in harvesting the beans without loss or injury since the harvesting is usually done by tractors, the wheels of which must pass down the furrows across which the vines are interlaced. Dividers have been used for this purpose, and in the past such dividers have broadly consisted of an upwardly and rearwardly inclined element, such as an elongated roller with a pointed shoe or the like at the lower leading end of the roller. However, upon engagement of the shoe or pointed end with some obstruction, the divider will be broken or injured unless relief from such obstruction is instantly provided. In the past, attempts to provide means for relieving the divider of such strain have been along the lines of pivoting the divider so the lower obstruction engaging end will swing rearwardly on its pivot. However, this has not generally been successful, since the lower end is still in a position to engage the obstruction, and many times the swinging of the divider results in a more severe "digging in" of the lower end, rather than relieving it from the objectionable obstacle. Further, the vines themselves are loaded on the upper end of the divider.

With the present invention the divider is supplied in a manner whereby it will be positively moved upwardly and over any objectionable obstacle as soon as it engages such obstacle, thereby preventing any injury to the divider and also making it much easier on the tractor or whatever power is employed for moving the harvester. The function of the divider in separating the vines remains unimpaired at all times.

Once the bean vines have been divided and moved to opposite sides of the ground wheels of

2 the harvester they must be cut and formed into windrows. Heretofore separate cutters and windrow forming devices have been used with the result that the vines may jam and be dragged along the ground, and also the cutters and windrow forming devices must be independently adjusted relative to each other, which is a time consuming operation as well as one that is not certain and that may require considerable experimentation before the adjusting is entirely satisfactory. Usually the windrow forming devices have been in the form of rakes, a single angularly extending rake (relative to the rows of beans) being used in many instances for as many as four rows of beans. Such rakes are generally known as "side delivery rakes."

With this present invention the vines that have been divided by the dividers are cut and windrowed at substantially the same time by a unitary device (one for each row) carried on the conventional tool bar of a conventional tractor. From four to six and even more rows of vines may be cut and formed into windrows by the present invention at one time without requiring complicated equipment.

Other objects and advantages will appear in the description and in the drawings.

In the drawings, Fig. 1 is a plan view showing the wheels of a three wheeled tractor, the tool bars and the elements of the present invention in full line. The engine and frame are outlined in dash lines.

Fig. 2 is an enlarged sectional view of one of the combination cutters and windrowing devices as seen along line 2—2 of Fig. 1.

Fig. 3 is a front elevational view of the device of Fig. 2 as seen directly at right angles from the point of view of Fig. 2.

Fig. 4 is an enlarged side elevational view of the front wheel of the tractor showing the vine divider connected therewith.

Fig. 5 is a fragmentary enlarged sectional view taken along line 5—5 of Fig. 4.

Fig. 6 is a fragmentary enlarged sectional view taken along line 6—6 of Fig. 4.

Fig. 7 is a fragmentary enlarged sectional view taken along line 7—7 of Fig. 4.

Fig. 8 is a fragmentary elevational view showing the manner in which the divider supports for the rear wheels may be connected with the tool bars, the latter being indicated in cross section.

In detail, the invention as illustrated in the drawings is applied to a three-wheel tractor in which there is a single leading wheel, but it is to be understood that the invention is not restricted to a three wheeled tractor. It may be used wherever there are ground wheels irrespective of the number of such wheels.

The front wheel of the tractor is indicated at 1 and the rear wheels at 2, the latter being spaced equal distances at opposite sides of the path of travel of the front wheel. In the drawing the spacing of the wheels is such that the front wheel will follow the furrow or space between the center pair of four equally spaced rows, while the rear wheels will follow the furrows or spaces between the outside rows of said four rows and the next adjacent rows outside the four rows. In any event, whether the harvester is for two or more rows, the wheels follow the furrows or spaces between rows and are so spaced.

A vine divider is positioned in advance of each of the ground wheels. In each instance the divider itself has the same construction, although the means for mounting it on the harvester may vary according to the facilities available for so mounting it. This divider is indicated at 3.

The front wheel 1 (Figs. 1, 4) is supported for rotation on an axle 4 that is carried at its ends in the lower ends of downwardly directed fork arms 5, the latter being connected at their upper ends above the wheel 1, and said fork arms are connected in the usual manner with a steering mechanism (not shown) on the tractor. The wheel 1 is between said fork arms.

Secured to each of the fork arms 5 is a downwardly projecting member 6. The lower ends of said members are pivotally connected at 7 with a pair of forwardly convergently extending arms or members 8.

The arms 8 are rigidly secured together at their forward ends by bolts 9, 10 or in any other suitable manner, the bolt 9 being rearwardly of bolt 10, and extending through a generally vertically extending slot 11 formed in a lug 12 that extends upwardly from a horizontally extending ground shoe 13. The forward end 14 of said ground shoe is curved upwardly to facilitate its sliding over the ground in the furrow between adjacent rows of vines.

By reason of the bolt and slot connection between lug 12 and arms 8, the shoe 13 may be raised or lowered relative to said arms, or tilted in a vertical plane for swinging the forward end of the shoe upwardly or downwardly.

Rigidly secured to the forward ends of arms 8 by any suitable means is an upwardly and rearwardly inclined track bar 20. The lower end of this track bar may be rearwardly bent to extend between the forward ends of arms 8, and the bolt or rivet 10 may extend through this rearwardly bent portion. However, the particular manner of connecting the track to the arms is not particularly important.

The track bar 20 supports a carriage thereon comprising an elongated member 21 that is substantially parallel with the track 20 and above the latter. This member 21 has a downwardly opening recess 22 adjacent its upper end and a similar downwardly directed recess 23 adjacent its lower end. A pair of spaced side pieces 25 are secured to the member 21 and extend at right angles thereto past opposite open sides of recess 22, and a roller 24 is disposed in said recess. This roller is carried on a shaft 26 that in turn is secured at its ends to the side pieces 25.

Another roller 27 is supported between said side pieces 25 at the lower ends of the latter and below track 20.

A similar pair of side pieces 29 extend past the open sides of the lower recess 23 and carry a roller 30 that rides on the upper side of track 20. These side pieces 29 are relatively short as compared with the pieces 25, and carry only the single roller 30. However, between the recesses 22, 23, but relatively close to the latter, are side pieces 32 that are secured to the bar 21 and that extend past opposite sides of the track 20. These side pieces 32 carry a roller 33 therebetween at their lower ends and below track 20.

The side pieces 25, 32 not only function as carriers for rollers, but they also function as guides for supporting the bar 21 over and coplanar with track 20.

The upper and lower ends of bar 21 are respectively formed with angular extensions 35, 36 that are journalled to receive the upper and lower ends of a roller shaft 37. This shaft 37 carries an elongated roller 38 that is convergently tapered from its upper to its lower end, and which roller is rotatable about its longitudinal axis, the latter being generally parallel with the bar 21, although, due to the taper of the roller said axis of rotation is spaced a slightly greater distance at its upper end from bar 21 than it is spaced from said bar at its lower end.

The lower extension 36 extends obliquely forwardly relative to the lower end of the bar 21, and the forward end of said extension carries a pointed earth engaging blade 39, that is inclined to substantially correspond with the inclination of the roller 38, and the generally forwardly facing side of said blade is preferably convex in horizontal cross sectional contour. The concave generally rearwardly and downwardly facing side of said blade at its upper end extends slightly over the lower end of roller 38.

In actual practice, the shoe 13 supports the blade in a position in which the pointed forward end of said blade will pass just below the surface of the ground.

Also secured to the blade 39, are a pair of rearwardly horizontally divergently extending rods 40.

These rods 40 extend to opposite sides of the wheel 1 and function to force the divided vines away from the wheel 1, since said vines would tend to fall back under the wheel until they are cut from the ground.

The dividers generally designated 45, 46 (Fig. 1) are identical with the divider ahead of the front wheel 1. In some instances the arms for supporting said rear dividers are preferably supported from conventional tool bars 47 that are carried by the tractor ahead of the rear wheels 2.

In the present instance, as seen in Fig. 8, a pair of downwardly projecting brackets 48 may be carried at their upper ends on a plate 49 that in turn may be adjustably clamped by bolts 50 and an upper plate 51 to said tool bars 47.

Forwardly extending arms 52 that substantially correspond with arms 8 of Fig. 4 may be pivotally secured at their rear ends at 53 to the lower ends of brackets 48.

While rods 40 of dividers 45 and 46 are secured in the same manner as the rods 40 of divider 3, an additional rod 55 is secured at its forward end to the outside arm 52 of each pair so as to extend rearwardly to the outer side of each rear wheel 1. This prevents the vines in the rows at the opposite outer sides of the pair of rear wheels (which vines are not cut from the ground) from falling beneath the rear wheels after they have been divided.

In operation, as the tractor moves forwardly the blades 39 pass below the vines that are interlaced across the paths of the ground wheels ahead of the latter. As the blades pass below said vines, the latter are progressively divided as they move upwardly over the roller above each blade. The roller of each divider will rotate to one side or the other according to the force of the vines thereagainst thus causing no detrimental injury to the beans. As the vines are divided the rods 40 will move them to the side out of the path of the wheel adjacent thereto. These rods extend past the center of the front wheel, hence the vines will be guided past the wheel even though they may not be severed from the ground.

In the event the blade 39 should strike some obstruction or any abnormal resistance, the carriage 21 will roll rearwardly up the track bar 20 and the blade will free itself. After the obstruction is past, the carriage will automatically roll back down the track.

Alongside the track bar 20 and between the upper and lower pairs of side plates 25, 32, an adjustable stop 56 is provided that has a slot 57 therein through which a bolt or screw 58 extends into said track bar for securing the stop to the track bar. There may be a corresponding stop on each opposite side of the track bar. The upper side pieces 25 will strike the stop or stops 56 upon rolling downwardly, to limit the downward movement of the carriage. By moving the stop to different positions on the track bar the depth to which the blade 37 extends into the ground may be regulated. A stop 56' at the upper end of the track bar prevents the carriage from being moved off the track bar.

The shoe 13 may ride upwardly and downwardly in the furrow according to the contour of the furrow due to pivots 7 and 53 that respectively connect the arms 8 and arms 52 to the members 6 and bracket 48.

Ahead of the rear wheels 2 and behind the front wheel 1 are tool bars 47. These are standard on most farm tractors, being secured to the frame through linkage permitting the lifting and lowering of the bars. These bars are employed for any kind of cultivator tools that may be desired.

In the present instance where the tractor is used for harvesting beans, etc., these bars are used to carry the vine cutters and windrow forming elements.

The drawing shows four cutters 59, 60, 61, 62 arranged in two pairs, one pair 59, 60 being at the one side of the path of travel of the front wheel, and the other pair 61, 62 being at the other side of the path of travel of said wheel.

Inasmuch as the structure of each cutter is the same, except that the cutters of each pair are right and left handed, the same numbers will be used for each cutter and its associated elements. Only one need be described in detail.

Each cutter comprises a horizontally disposed elongated blade 63 that comes to a point 63' at one end, which is the leading end relative to the normal direction of travel of the cutter. The one edge 64 is sharpened to form a cutting edge and this edge extends to the point 63'.

Secured to the upper side of the blade 63 at the pointed end is a rod 65 that comprises the windrow forming element. This element is tapered at its forward end so as to form a smooth surface with the pointed end of the blade, and the rod then extends upwardly and rearwardly from its front end and substantially in the same direction as blade 63.

Also secured to the upper side of blade 63 at a point spaced rearwardly from its forward end is the lower end of an arm 66. This arm is curved adjacent its lower end so as to extend past the windrow forming rod at the side of the latter opposite the cutting edge 64.

The upper end of the arm 66 is secured to a plate 67 that extends across the lower sides of the tool bars 47. A plate 68 extends over the upper sides of said tool bars and bolts 69 clamp the plates rigidly to the tool bars.

The bolts 69 are at the opposite outer sides of the pair of tool bars 67, and sufficient spacing between them and said bars is permitted to permit any desired angular adjustment of said plates relative to the tool bars, with the result that the cutters and windrow forming rods may be angularly adjusted relative to each other.

The cutting edges of the cutters 59, 60 are arranged so as to generally face each other and to extend obliquely across the row of beans of two of the four rows. This will cause said cutters to extend convergently from their forward to their rear ends, therefore the windrow forming rods 65 will also extend obliquely across the said two rows and they will be positioned at the adjacent sides of the posts 66 that carry the cutters 59, 60.

The cutters 61, 62 are arranged similar to cutters 59, 60, but for the other two of the rows.

In operation, as the harvester moves forwardly, the cutters 59, 60 will cut the two rows of beans between dividers 3, 45 from the ground and the rods 65 on said cutters will crowd the vines of these two rows into a single windrow that will emerge from behind the convergent rear ends of rods 65. These rods are sufficiently resilient to prevent any jamming of the vines irrespective of whether the vines that are windrowed are heavy or light.

The cutters 61, 62 will cut the other two rows of vines from the ground, and the rods 65 thereon will move them into a single windrow following their convergent ends.

The rods 55 function to prevent the outmost rows of uncut, but divided, beans from falling in front of the wheels 2 after the dividers 45, 46 have divided the rows ahead of wheels 2.

As has already been mentioned, the tool bars 47 are conventional and means (not shown) is provided for lifting them from the ground whenever so desired.

There are many ways of elevating the front divider. When the tractor is turned, or at any other time, but one means is indicated in Fig. 1 in full line in which a shaft 70 is rotatably supported in bearings 71 that are adapted to be secured to front end of frame 72 of the tractor, the latter being indicated in dot-dash lines. A crank arm 73 is secured at one end to shaft 70 in a position extending upwardly therefrom (when the divider is elevated) and horizontally forwardly, when the divider is down.

A chain 74 connects the upper end of the track bar 20 (Fig. 4) with the outer end of crank arm 72 (Fig. 1).

A second crank arm 75 secured at one end to shaft 70 is connected at its outer end to one end of a rod 76 that extends rearwardly to a point adjacent the operator where the rod may be reciprocated by a conventional lever handle 77. Upon moving rod 76 forwardly the divider will be lower to full line position of Fig. 4 and upon moving rod 76 rearwardly the front divider will be swung upwardly and free from the ground.

I claim:

1. In a vehicle that includes wheels supporting the same for movement in one direction of travel over the ground, a vine divider adapted to be carried on said vehicle forwardly of each of said wheels relative to said direction of travel, said vine divider comprising an elongated track slantingly disposed relative to the ground with its lower end leading and its upper end rearwardly of said lower end relative to said direction of travel, a shoe secured to the lower end of said track for slidably engaging the ground and supporting the weight of said track, a forwardly extending member on said vehicle connecting said shoe with said vehicle, an elongated carriage mounted on said track for reciprocatory movement therealong; an elongated roller rotatably supported at its opposite ends on said carriage with its axis of rotation substantially parallel to said track, said roller being bodily movable with said carriage to a lower position under the influence of gravity and free for movement generally upwardly and rearwardly along said track under a predetermined rearwardly directed pressure on said carriage.

2. In a vehicle that includes wheels supporting the same for movement in one direction of travel over the ground, a vine divider adapted to be carried on said vehicle forwardly of each of said wheels relative to said direction of travel, said vine divider comprising an elongated track slantingly disposed relative to the ground with its lower end leading and its upper end rearwardly of said lower end relative to said direction of travel, a shoe secured to the lower end of said track for slidably engaging the ground and supporting the weight of said track, a forwardly extending member on said vehicle connecting said shoe with said vehicle, an elongated carriage mounted on said track for reciprocatory movement therealong; an elongated roller rotatably supported at its opposite ends on said carriage with its axis of rotation substantially parallel to said track, said roller being bodily movable with said carriage to a lower position under the influence of gravity and free for movement generally upwardly and rearwardly along said track under a predetermined rearwardly directed pressure on said carriage, said carriage being provided with an earth engaging blade at its lower end at a point below and forwardly of said roller for directing vines upwardly and rearwardly toward said roller.

3. In a vehicle that includes wheels supporting the same for movement in one direction of travel over the ground, a vine divider adapted to be carried on said vehicle forwardly of each of said wheels relative to said direction of travel, said vine divider comprising an elongated track slantingly disposed relative to the ground with its lower end leading and its upper end rearwardly of said lower end relative to said direction of travel, a shoe secured to the lower end of said track for slidably engaging the ground and supporting the weight of said track, a forwardly extending member on said vehicle connecting said shoe with said vehicle, an elongated carriage mounted on said track for reciprocatory movement therealong; an elongated roller rotatably supported at its opposite ends on said carriage with its axis of rotation substantially parallel to said track, said roller being bodily movable with said carriage to a lower position under the influence of gravity and free for movement generally upwardly and rearwardly along said track under a predetermined rearwardly directed pressure on said carriage, said carriage being provided with rollers in engagement with the opposite sides of said track for facilitating said movement of the carriage along said track.

4. In a vehicle that includes wheels supporting the same for movement in one direction of travel over the ground, a vine divider adapted to be carried on said vehicle forwardly of each of said wheels relative to said direction of travel, said vine divider comprising an elongated track slantingly disposed relative to the ground with its lower end leading and its upper end rearwardly of said lower end relative to said direction of travel, a shoe secured to the lower end of said track for slidably engaging the ground and supporting the weight of said track, a forwardly extending member on said vehicle connecting said shoe with said vehicle, an elongated carriage mounted on said track for reciprocatory movement therealong; an elongated roller rotatably supported at its opposite ends on said carriage with its axis of rotation substantially parallel to said track, said roller being bodily movable with said carriage to a lower position under the influence of gravity and free from movement generally upwardly and rearwardly along said track under a predetermined rearwardly directed pressure on said carriage, said roller being frusto-conical in shape with its smaller diameter at its lower end for spreading said vines apart as the same are urged upwardly along said roller.

5. In a vehicle that includes wheels supporting the same for movement in one direction of travel over the ground, a vine divider adapted to be carried on said vehicle forwardly of each of said wheels relative to said direction of travel, said vine divider comprising an elongated track slantingly disposed relative to the ground with its lower end leading and its upper end rearwardly of said lower end relative to said direction of travel, a shoe secured to the lower end of said track for slidably engaging the ground and supporting the weight of said track, a forwardly extending member on said vehicle connecting said shoe with said vehicle, an elongated carriage mounted on said track for reciprocatory movement therealong, an elongated roller rotatably supported at its opposite ends on said carriage with its axis of rotation substantially parallel to said track, said roller being bodily movable with said carriage to a lower position under the influence of gravity and free for movement generally upwardly and rearwardly along said track under a predetermined rearwardly directed pressure on said carriage, said forwardly extending member being pivotally secured to said vehicle to permit vertical movement of said track and carriage in accordance with irregularities on the ground over which said shoe is movable.

THOMAS R. WARNER.

References Cited in the file of this patent

UNITED STATES PATENTS

| Number | Name | Date |
|---|---|---|
| 270,381 | Bradford | Jan. 9, 1883 |
| 298,064 | Brown | May 6, 1884 |
| 866,185 | Brown | Sept. 17, 1907 |
| 1,398,859 | Hurtig et al. | Nov. 29, 1921 |
| 1,852,702 | Coultas | Apr. 5, 1932 |
| 1,900,806 | Evenson | Mar. 7, 1933 |
| 1,944,829 | Self | Jan. 23, 1934 |
| 1,971,495 | McGee et al. | Aug. 28, 1934 |
| 2,133,905 | Rund, Jr. | Oct. 18, 1938 |
| 2,466,555 | Paine | Apr. 5, 1949 |

FOREIGN PATENTS

| Number | Country | Date |
|---|---|---|
| 851,071 | France | Sept. 25, 1939 |